United States Patent Office 3,647,672
Patented Mar. 7, 1972

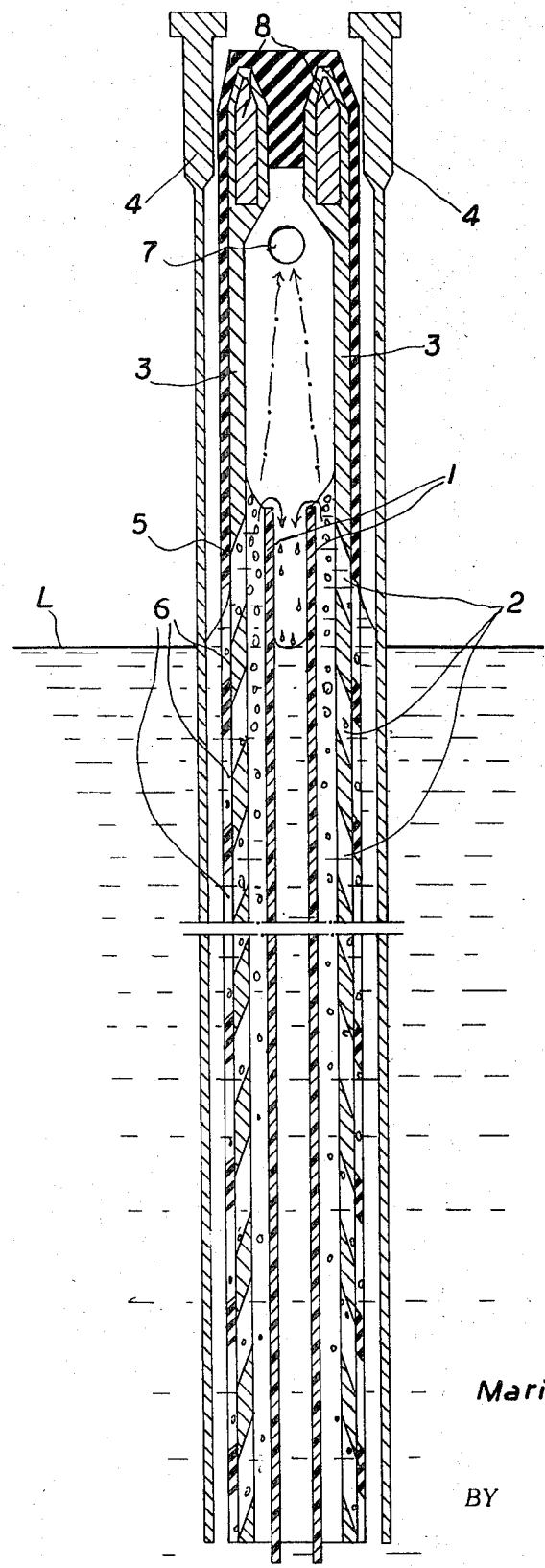

3,647,672
ELECTRODE WITH AEROLIFTING AND GAS-SEPARATION EFFECTS FOR ELECTROLYSIS OF SOLUTIONS OF ELECTROLYTES
Marin Russev Mehandjiev, Plovdiv, Bulgaria, assignor to Nautchno-Izsledovatelski Institut po Tzvetna Metalurgiya, Plovdiv, Bulgaria
Filed Nov. 12, 1968, Ser. No. 775,042
Claims priority, application Bulgaria, Nov. 13, 1967, 8,871
Int. Cl. B01k 3/04
U.S. Cl. 204—284     9 Claims

ABSTRACT OF THE DISCLOSURE

An electrode for electrolytic processes has a thin-walled hollow body with a pair of internal partitions of inert or nonconductive material defining with the electrode walls a pair of narrow air-lifting channels which communicate through inclined slots with the outer electrode surface; these partitions terminate within the electrode body above the electrolyte level but below the top of the electrode whereby gases evolving at the outer electrode surface, entering the channels through the inclined slots, rise in the channels and generate a circulation of electrolyte liquid which overflows the partitions and returns to the external electrolyte pool through a central compartment and the open bottom of the electrode.

My present invention relates to an electrode for electrolytic processes in which gas evolution takes place at the interface between an electrode surface and a liquid electrolyte in contact therewith.

In many electrolytic systems, the evolving gases constitute at least a by-product whose recovery is economically important; in other instances the presence of gases between confronting faces of electrodes of opposite polarity merely interferes with the electrochemical reaction and is therefore undesirable.

Thus, it is an object of my present invention to provide electrode having means for rapidly and thoroughly removing evolving gases from an active electrode surface without the expenditure of extraneous energy.

This object is realized, pursuant to my present invention, by the provision of an electrode whose upright hollow body has at least one wall, preferably two parallel walls, of electrically conductive material formed with apertures for the inward passage of gases evolving along the outer electrode surface, the interior of the electrode body including at least one and preferably two upright partitions which define a air-lifting channel or a pair of such channels with the adjacent inner wall surface or surfaces, each partition terminating below the top of the electrode body in an upper edge which, upon immersion of the electrode into a liquid electrolyte, lies above the electrolyte level. An overflow compartment, defined by the partition means adjacent the air-lifting channel (or, preferably, between the two channels), communicates below that level with the exterior of the electrode body, the channel or channels being narrow enough to allow the entering gases to entrain accompanying electrolyte liquid upwardly across the upper partition edge whereby this liquid spills over into the overflow compartment for return to the outer electrolyte pool. An outlet in the upper part of the electrode body, above the electrolyte level, allows the gases to escape and, if desired, to be collected for further utilization.

The invention will be described in greater detail with reference to the accompanying drawing the sole figure of which shows, in vertical cross-sectional view, an electrolytic system embodying my present improvement.

The system shown in the figure comprises an upright electrode with a four-sided prismatic body whose two major sides are formed by thin metallic walls 3. A pair of counterelectrodes 4 of opposite polarity, which could also be part of a single electrode body, confront the outer surfaces of walls 3 to form respective interaction spaces therewith. These outer surfaces are partly covered by a nonconductive layer 5 having cutouts 6 which expose portions of the metallic walls and which also communicate with apertures 2 in these walls, the apertures being shown partly obstructed by the overhanging layer. As illustrated, the apertures 2 are bores or slots whose upper and lower boundaries are inwardly and upwardly inclined so as to include an acute angle, of not less than about 5°, with the horizontal, i.e. with a line perpendicular to the electrode surface. Two partitions 1, whose upper edges lie well below the top of the electrode body, together form a central overflow compartment and define a pair of air-lifting channels with the inner surfaces of the adjoining walls 3; the two channels as well as the central compartment communicate with the exterior through the open bottom of the electrode body. One or both of the narrow sides of this body are provided with an outlet or outlets 7 for evolving gases at a location well above the edges of partitions 1. These partitions are shown to be constituted of dielectric material but also can be made of electrochemically inert metal. Terminal leads 8 are shown to extend along the upper edges of walls 3 for connection to a source of operating voltage, not shown.

In operation, the electrodes shown in the drawing are immersed in an electrolytic liquid to a level L, leaving a free portion of electrode body 3 which may amount to a fraction of the length of that body and preferably ranges between about 5% and 50% of that length. Thereafter, e.g. upon connection of the electrode bodies 3, 4 to opposite terminals of a voltage source (in the case of an electrochemically passive system), gases begin to evolve in the interaction spaces between the two confronting pairs of electrode surfaces, these gases passing inwardly through the cutouts 6 and the apertures 2 to reach the air-lifting channels adjacent partitions 1. Rising in these channels, the gases entrain some of the accompanying liquid upwardly and across the upper edges of the partitions while escaping through the outlet 7 as indicated by dot-dash arrows. The air-lifted liquid overflowing the partitions 1, as indicated by solid arrows, returns to the external electrolyte pool through the central channel so as to set up a continuing circulation, with the relatively light gas/liquid mixture streaming inward and upward through apertures 2 in a steady flow so as to clear the interaction spaces of evolving gases as rapidly as they develop.

In practice, the electrode walls 3 may have a width-to-height ratio ranging between about 1:1 and 1:2; the height of the partitions 1 may range between 0.5 and 0.6 times the height of the exposed electrode surface. At their lower ends, as shown, the partitions may project (e.g. up to about 1/60 of their height) below the bottom edge of body 3 and counterelectrodes 4, thereby directing the circulating flow away from the interaction spaces to promote the influx of fresh electrolyte into these spaces.

What is claimed is:

1. An electrode for electrolytic processes, comprising an upright hollow body in the form of a downwardly open prismatic box with parallel sidewalls of electrically conductive material, a pair of upright partitions in said body having upper edges below the top of said box and forming with said side walls a pair of vertical air-lifting channels, said partitions further defining a central overflow compartment between said channels, said sidewalls being provided with apertures slanting upwardly and inwardly toward said partitions for giving passage to gases evolving from an external electrolyte liquid upon immersion of said body into said liquid to a depth establishing the electrolyte level below said upper edges, said channels being narrow enough to allow said gases to rise therein with upward entrainment of electrolyte liquid across said upper edges and into said overflow compartment, said body being formed with an outlet above said level for said gases, said compartment communicating with the exterior at a location below said level.

2. An electrode as defined in claim 1 wherein said sidewalls are provided at their outer surfaces with nonconductive layers exposing part of said outer surfaces.

3. An electrode as defined in claim 2 wherein said layers partly obstruct said apertures.

4. An electrode as defined in claim 1 wherein said partitions project downwardly below the open bottom of said box.

5. An electrode for electrolytic processes, comprising an upright hollow body with an open bottom and with wall means of electrically conductive material, upright partition means in said body terminating at an uper edge below the top of said body and forming with said wall means at least one substantially vertical air-lifting channel, said partition means further defining a central overflow compartment adjacent said channel, said wall means being provided with a series of vertically spaced apertures slanting upwardly toward said partition means and terminating below the level of said upper edge for giving passage to gases evolving from an external electrolyte liquid upon immersion of said body into said liquid to a depth establishing the electrolyte level below said upper edge, said channel being narrow enough to allow said gases to rise therein with upward entrainment of electrolyte liquid across said upper edge and into said overflow compartment, said body being formed with an outlet above said electrolyte level for said gases, said compartment communicating with the exterior at a location below said electrolyte level.

6. An electrolytic system comprising an electrode as defined in claim 13 and at least one upright counterelectrode substantially coextensive in length with said wall means and closely spaced from the outer surface thereof opposite side apertures.

7. The combination defined in claim 5 wherein said wall means is provided at its outer surface with a nonconductive layer exposing part of said outer surface.

8. The combination defined in claim 7 wherein said layer partly obstructs said apertures.

9. An electrode as defined in claim 5 wherein said partitions project downwardly below the open bottom of said body.

References Cited

UNITED STATES PATENTS

| | | | |
|---|---|---|---|
| 2,194,443 | 3/1940 | Hardy et al. | 204—284 |
| 2,691,628 | 10/1954 | Aannerud | 204—283 |
| 3,012,958 | 12/1961 | Vixler | 204—197 |

TA-HSUNG TUNG, Primary Examiner

U.S. Cl. X.R.

204—278